(12) United States Patent
    Zou et al.

(10) Patent No.: US 11,082,588 B2
(45) Date of Patent: Aug. 3, 2021

(54) CAMERA APPARATUS AND TERMINAL DEVICE

(71) Applicant: BOE TECHNOLOGY GROUP CO., LTD., Beijing (CN)

(72) Inventors: Xiangxiang Zou, Beijing (CN); Yangyang Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/543,399

(22) Filed: Aug. 16, 2019

(65) Prior Publication Data
    US 2020/0236253 A1    Jul. 23, 2020

(30) Foreign Application Priority Data
    Jan. 22, 2019  (CN) .......................... 201920104764.3

(51) Int. Cl.
    *H04N 5/225*    (2006.01)
    *G03B 17/02*    (2021.01)
(52) U.S. Cl.
    CPC ........... *H04N 5/2252* (2013.01); *G03B 17/02* (2013.01); *H04N 5/2253* (2013.01)

(58) Field of Classification Search
    CPC ..... H04N 5/2252; H04N 5/2253; G03B 17/02
    See application file for complete search history.

(56) References Cited

U.S. PATENT DOCUMENTS 5,801,919 A  *  9/1998  Griencewic ........... G06F 1/1686
                                                      348/552
2012/0281084 A1*  11/2012  Hatcher ................. F01D 9/023
                                                      348/83

* cited by examiner

*Primary Examiner* — Yogesh K Aggarwal
(74) *Attorney, Agent, or Firm* — Thomas | Horstemeyer, LLP

(57) ABSTRACT

The present disclosure relates to the display technical field and, specifically, relates to a camera apparatus and terminal device. The camera apparatus includes a mounting body, a camera, and an adjustment component. The camera includes a first surface for framing and a second surface opposite to the first surface. The adjustment component includes a plurality of telescopic rods, and each of the telescopic rods includes a first end and a second end, the first end being connected with the mounting body, and the second end being connected with the second surface of the camera. The orientation of the first surface of the camera is adjusted by adjusting the telescopic degree of each of the telescopic rods.

14 Claims, 7 Drawing Sheets

CAMERA APPARATUS AND TERMINAL DEVICE

CROSS-REFERENCE TO RELATED APPLICATIONS

The present disclosure claims the priority to the Chinese patent application NO. 201920104764.3, filed on Jan. 22, 2019, which is incorporated herein by reference in its entirety.

TECHNICAL FIELD

The present disclosure relates to the display technical field and, more specifically, relates to a camera apparatus and a terminal device.

BACKGROUND

With the development of display technology, most terminal devices have camera functions. Presently, in order to enable the terminal device to have a front and back camera function, two cameras are usually disposed in the terminal device to achieve the front and back camera function, respectively. However, the cost is higher and is prohibitive in achieving a full screen display of the terminal device.

It should be noted that the information disclosed in the background section above is only for enhancing the understanding of the background of the present disclosure and thus, may include information that does not constitute prior art known to those skilled in the art.

SUMMARY

A first aspect of the present disclosure provides a camera apparatus, the camera apparatus including a mounting body, a camera, and an adjustment component.

The camera includes a first surface and a second surface. The first surface is configured for framing. The second surface is configured for framing and opposite to the first surface.

The adjustment component includes a plurality of telescopic rods, and each of the telescopic rods includes a first end and a second end, where the first end is connected with the mounting body, and the second end is connected with the second surface;

In one embodiment, the orientation of the first surface of the camera is adjusted by adjusting the telescopic degree of each of the telescopic rods.

In one exemplary embodiment of the present disclosure, the first end is actively connected with the mounting body, and the second end is rotatably connected with the second surface of the camera.

In one exemplary embodiment of the present disclosure, the first end is rotatably connected with the mounting body.

In one exemplary embodiment of the present disclosure, the first end is slidably connected with the mounting body.

In one exemplary embodiment of the present disclosure, the mounting body is provided with a plurality of elongated sliding slots, and the first end of each of the telescopic rods is located in the sliding slot corresponding to each of the telescopic rods, and the first end is configured to slide along the length direction of the sliding slot.

In one exemplary embodiment of the present disclosure, the camera apparatus further includes a locking component, where the locking component is mounted on the first end of each of the telescopic rods, and the locking component is configured so that the first end of the telescopic rod and the mounting body is locked when the first surface of the camera faces towards a target direction.

In one exemplary embodiment of the present disclosure, the camera apparatus further includes:

a driving component, connected with each of the telescopic rods, configured to drive the telescopic rods to perform a telescopic movement to adjust the telescopic degree of the telescopic rods.

In one exemplary embodiment of the present disclosure, the camera apparatus further includes a control element, and the driving component is connected with the control element.

In one exemplary embodiment of the present disclosure, a side of the mounting body is provided with a containing groove, and the first end of the telescopic rod is connected with a slot bottom of the containing groove.

In one exemplary embodiment of the present disclosure, the mounting body includes a display side and a non-display side, and the containing groove is located on the non-display side.

In one exemplary embodiment of the present disclosure, the non-display side includes a back side and a circumference side, where the back side is opposite to the display side, the circumference side is located between the display side and the back side and is connected with the display side and the back side, and the containing groove is located on the circumferential side.

In one exemplary embodiment of the present disclosure, the circumferential side includes a top surface, and the containing groove is disposed on the top surface.

In one exemplary embodiment of the present disclosure, the plurality of telescopic rods include a first telescopic rod and a second telescopic rod, and the first telescopic rod is adjacent to the display side, through elongating the first telescopic rod relative to the second telescopic rod, the first surface of the camera faces to the display side, and through elongating the second telescopic rod relative to the first telescopic rod, the first surface of the camera faces to the back side.

In one exemplary embodiment of the present disclosure, the first surface of the camera is located inside the containing groove when each of the telescopic rods is in a contracted state.

In one exemplary embodiment of the present disclosure, an inside of the mounting body is provided with a circuit board.

A groove bottom of the containing groove is provided with a through hole communicating with the inside of the mounting body, and the through hole is used to pass a signal line connecting with the camera and the circuit board.

A second aspect of the present disclosure provides a terminal device, where the terminal device includes any one of the above-mentioned camera apparatuses.

It should be understood that the above general description and the detailed description in the following are only illustrative and explanatory and should not limit the present disclosure.

BRIEF DESCRIPTION OF THE DRAWINGS

The accompanying drawings are incorporated into the specification and form a part of the specification, show embodiments consistent with the present disclosure, and are used together with the specification to explain the principles of the present disclosure. It is apparent that the accompanying drawings in the following description are only some embodiments of the present disclosure, and for those skilled in the art, other accompanying drawings may be obtained according to these accompanying drawings without creative labor.

DETAILED DESCRIPTION

Figure 1:
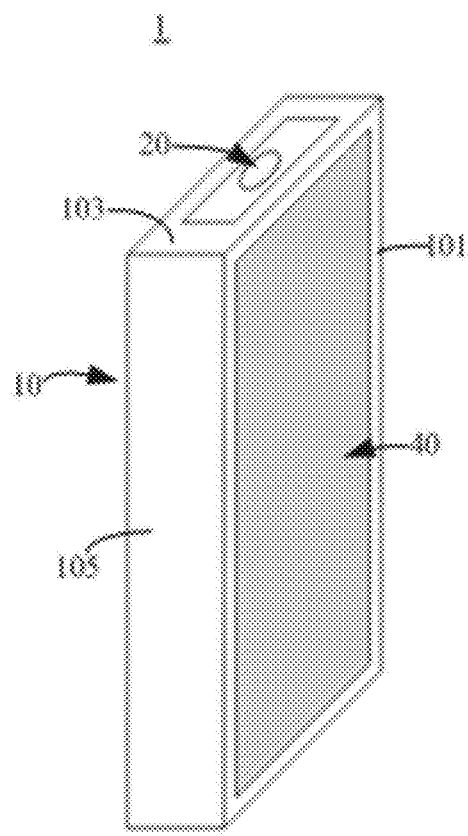
FIG. 1 is a structural schematic view of the camera apparatus described in the embodiment of the present disclosure.

Now, example embodiments will be described more fully with reference to the accompanying drawings. However, the example embodiments can be embodied in many forms and should not be understood as being limited to the embodiments set forth herein. On the contrary, these embodiments are provided so that the present disclosure will be comprehensive and integrated, and the concept of the example embodiments is fully conveyed to those skilled in the art. The same reference numerals of the accompanying drawings denote the same or similar structures, and thus, their detailed description will be omitted.

Although the relative terms such as "upper" and "lower" are used in the present specification to describe the relative relationship of one component to another component marked of the reference numerals, these terms used in the present specification are only for convenience, for example, according to the direction of the example described in the accompanying drawings. It can be understood that if the device of the reference numeral is flipped upside down, the component described "upper" will become the component "lower". When a component is "on" the other component, it may mean that a component is integrally formed on the other component, mean that a component is "directly" disposed on the other component, or mean that a component is "indirectly" disposed on the other disposed by another component.

The terms "one", "a/an", "the", and "said" are used to denote the presence of one or more elements/components, etc. The terms "including" and "having" are used to denote an open-ended inclusive meaning, and mean that additional elements/components/etc. further exist, in addition to the listed elements/components/etc. The terms "first" and "second" are used as labels only and not the number limit of objects.

With the development of display technology, most terminal devices have camera functions. In related technologies, in order to enable the terminal device to have the front and back camera functions, two cameras are usually disposed in the terminal device to achieve the front and back camera functions, respectively. However, the cost is higher, and the design of two cameras is prohibitive to achieving a full screen display of the terminal device.

In order to solve the above mentioned technical problem, the embodiment of the present disclosure provides a camera apparatus. As shown in FIG. 1, the camera apparatus can be applied to the terminal device 1. It should be noted that the camera apparatus can not only be applied to the terminal device 1, but also be applied to other devices depending on the specific situation.

In the present embodiment, as shown in FIG. 1 to FIG. 9, the camera apparatus may include a mounting body 10, a camera 20, and an adjustment component 30.

The camera 20 may include a first surface 201 for framing (that is, a framing surface) and a second surface 202 opposite to the first surface 201. It should be noted that the first surface 201 and the second surface 202 may both be planar, but are not limited thereto. In addition, the entire area of the first surface 201 may be used for framing, or a part of an area of the first surface 201 may be used for framing, which can depend on the specific situation.

The adjustment component 30 may include a plurality of telescopic rods, and each of the telescopic rods can perform a telescopic movement. It should be noted that the plurality mentioned here includes two, or more than two, that is, the adjustment component 30 may include at least two telescopic rods. In detail, each of the telescopic rods may include a first end 301 and a second end 302. The first end 301 of the telescopic rod may be connected with the mounting body 10, and the second end 302 of the telescopic rod can be connected with the second surface 202 of the camera 20. That is to say, the camera 20 can be mounted on the mounting body 10 by a telescopic rod.

In one embodiment, each foregoing mentioned telescopic rod can perform telescopic movement. That is to say, the telescopic degree of each telescopic rod can be adjusted. Therefore, the orientation of the first surface 201 of the camera 20 can be adjusted by adjusting the telescopic degree of each telescopic rod. That is, the camera 20 can be switched at multiple angles by adjusting the telescopic degree of each telescopic rod to achieve the camera function at different angles. Since the camera apparatus in the present embodiment can achieve the camera function at different angles through a single camera 20, compared with the device adopted multiple cameras in the related technologies, the terminal device 1 adopted the camera apparatus can reduce the number of the cameras 20 while achieving the camera function at different angles, thereby the cost can be effectively reduced. In addition, the area of the display screen 40 of the terminal device 1 can be larger by adopting the camera apparatus, and even the overall screen display of the terminal device 1 can be achieved, which greatly improves the user experience.

It should be noted that, in the present embodiment, the telescopic degree of each of the telescopic rods may indicate the length of the telescopic rod, and the lengths of the telescopic rods may be the same or may be different. When the telescopic degree of each telescopic rod is the same, the only function of the adjustment component 30 includes elevating the camera 20, and the orientation of the first surface 201 of the camera 20 does not change, that is, the orientation of the first surface 201 of the camera 20 is in an initial state. When the telescopic degrees of at least two of the telescopic rods are different, the adjustment component 30 can not only function as elevating the camera 20, but also can change the orientation of the first surface 201 of the camera 20. It should be understood that when the telescopic degrees of at least two of the telescopic rods are different, the first surface 201 of the camera 20 will face to the side where the telescopic rod with a smaller telescopic degree is located. It should be added that, during the orientation adjustment process of the first surface 201 of the camera 20, the length of the telescopic rod will be changed, and the inclination angle of the telescopic rod will also be changed. Therefore, the telescopic degree can also indicate the length and inclination angle of the telescopic rod. Since the change in the inclination angle of the telescopic rod is adjusted accompanying the change in the length thereof, the change in the inclination angle thereof in the present disclosure will not be described again.

In one embodiment, the second end 302 of the telescopic rod is movably connected with the second surface 202 of the camera 20, and this design not only enables the angle adjustment of the camera 20 by the telescopic rod, but also can prevent the camera 20 from being stuck and un-moveable while reducing the manufacture difficulty of the camera 20, and reducing the manufacturing cost of the camera 20.

However, the connection manner between the second end 302 of the telescopic rod and the second surface 202 of the camera 20 is not limited to an active connection, but may also be a fixed connection. For example, when the camera 20 includes a folded portion that can be folded and unfolded, even if the second end 302 of the telescopic rod is fixedly connected with the second surface 202 of the camera 20, the orientation adjustment of the first surface 201 of the camera 20 may also be achieved by adjusting the telescopic degree of the telescopic rod to adjust the unfolded extent of the folded portion of the camera 20.

It is worth noting here that, when the second end 302 of the telescopic rod and the second surface 202 of the camera 20 are connected by adopting an active connection manner, the active connection manner of each telescopic rod and the camera 20 may be the same or may be different. For example, the active connection manner of each telescopic rod and the camera 20 may be a rotating manner or may be a combination of sliding and rotating manners.

It can be seen from the above mentioned embodiment that, when the second end 302 of the telescopic rod is actively connected with the second surface 202 of the camera 20, whether in a rotating manner or a combination manner of sliding and rotating, the second end 302 of the telescopic rod and the second surface 202 of the camera 20 can generate a relative rotation with both involved. Therefore, in order to reduce the manufacture difficulty and assemble difficulty of the telescopic rod and the camera 20, in the present embodiment, as shown in FIG. 2 to FIG. 9, the second end 302 of the telescopic rod is rotatably connected with the second surface 202 of the camera 20. As shown in figures, the second end 302 of each telescopic rod can be rotatably connected with the second surface 202 of the camera 20 by a rotating shaft 31.

Since the distance between the second end 302 of each telescopic rod is a fixed value when the second end 302 of each telescopic rod is rotatably connected with the second surface 202 of the camera 20 by a rotating shaft 31, in order to enable the telescopic rod to achieve the orientation adjustment of the first surface 201 of the camera 20 during the telescoping process, the first end 301 of the telescopic rod needs to be actively connected with the mounting body 10.

In one optional embodiment, the first end 301 of the telescopic rod is rotatably connected with the mounting body 10. As shown in FIG. 2 to FIG. 5, the first end 301 of each telescopic rod can be all rotatably connected with the mounting body 10 by a rotating shaft 31.

In another optional embodiment, the first end 301 of the telescopic rod is slidably connected with the mounting body 10. Specifically, the sliding connection manner of the first end 301 of the telescopic rod and the mounting body 10 may include the following two types:

the first type, as shown in FIG. 6 to FIG. 9, a sliding slot 107 is disposed on the mounting body 10, and the sliding slot 107 is elongated; the first end 301 of the telescopic rod is located in the sliding slot 107, and the first end 301 of the telescopic rod can slide along the length direction of the sliding slot 107.

the second type, the mounting body is provided with a sliding block, and the sliding block is elongated; a sliding slot that is slidingly engaged with the sliding block is disposed on the end surface of the first end 301 of the telescopic rod, and the first end 301 of the telescopic rod can slide along the length direction of the sliding block.

In one embodiment, the camera apparatus may further include a locking component (not shown in figures), and the locking component may be mounted on the first end 301 of the telescopic rod. The locking component is used to lock the first end 301 of the telescopic rod and the mounting body 10 when the first surface 201 of the camera 20 faces towards the target direction, which prevents the camera 20 from being active during camera use, thereby the camera quality and the user experience can be improved.

For example, the locking component may include a locking claw, and the locking claw can be folded during the orientation adjustment process of the first surface 201 of the camera 20, that is, in an unlocked state, so that the first end 301 of the telescopic rod can be moved relative to the mounting body 10. When the first surface 201 of the camera 20 is oriented to the target direction, the locking claw can be opened. That is, in a locking state, the first end 301 of the telescopic rod and the mounting body 10 are stuck, which prevents the occurrence of the relative movement between the first end 301 of the telescopic rod and the mounting body 10, and then, the function locking the first end 301 of the telescopic rod and the mounting body 10 is achieved. It should be noted that the locking component is not limited to the locking form, and may be other locking forms, which depends on a specific condition. The specific structure of the locking component can be obtained from the related technology by those skilled in the art, and the details are not described herein again.

In one embodiment, the camera apparatus may further include a driving component 50, and the driving component may be a micro linear electric motor, but it is not limited thereto. The driving component 50 may be connected with each telescopic rod for driving the telescopic rod to perform a telescopic movement to adjust the telescopic degree of the telescopic rod. In the present embodiment, through use of the driving component 50 to drive the telescopic rod to perform the telescopic movement, the automatic adjustment of the telescopic rod is achieved, thereby the orientation automatic adjustment of the first surface 201 of the camera 20 can be achieved.

In one embodiment, the camera apparatus may further include a control element 60, and the driving component is connected with the control element. The control element 60 may adjust the telescopic degree of the telescopic rod by controlling driving component to achieve the automatic adjustment of the telescopic rod, thereby the orientation automatic adjustment of the first surface 201 of the camera 20 can be achieved.

It should be noted that the control element 60 that controls the driving component 50 may be disposed independently of the mounting body 10, or may be disposed inside the mounting body 10.

For example, when the camera apparatus is applied to the terminal device 1, the control element 60 for controlling the driving component 50 in the camera apparatus may be a part of the circuit board 70 in the terminal device 1. Thus, the space occupied by the camera apparatus can be saved, and also, the cost of the terminal device 1 can be reduced.

In addition, it should also be noted that the telescopic degree of the telescopic rod can be adjusted not only automatically through the cooperation of the driving component 50 and the control element 60, but also through manually adjustment.

In the present embodiment, when the camera apparatus is applied to the terminal device 1, the mounting body 10 may be a housing structure of the terminal device 1. The housing structure may include a display side 101 and a non-display side. The display side 101 may be used to mount the display screen 40. As shown in FIG. 1 to FIG. 9, the display screen 40 may be embedded in the display side 101 of the mounting body 10, but it is not limited thereto.

The assembly relationship between the mounting body 10 and the camera 20 will be specifically described below in connection with the accompanying drawings.

In one embodiment, as shown in FIG. 2 to FIG. 10, one side of the mounting body 10 may provide with a containing groove 106. The first end 301 of the telescopic rod of the adjustment component 30 can connect with the groove bottom of the containing groove 106 (the groove bottom is the surface of the containing groove 106 opposite to the notch). Thus, when the camera 20 is mounted on the mounting body 10, at least a portion of the structure of the adjustment component 30 can locate within the containing groove 106 by this design, which thereby can reduce the space occupied by the entire terminal device 1.

Alternatively, the first surface 201 of the camera 20 is located inside the containing groove 106 when each telescopic rod is in a contracted state, that is, the adjustment component 30 and the camera 20 may both locate in the containing groove 106. This design can not only reduce the space occupied by the whole terminal device 1, but also can reduce the interference between the camera 20 and external objects, which can improve the safety in use of the camera 20. Alternatively, the first surface 201 of the camera 20 is flush with one side of the mounting body 10 on which the containing groove 106 is disposed, which can improve the appearance quality of the terminal device 1.

In one embodiment, the containing groove 106 can be located on the non-display side of the mounting body 10. That is to say, the camera 20 and the adjustment component 30 cannot occupy the position of the display side 101 of the mounting body 10 so that the mounting body 10 can fully display on the display side 101. That is, the area of the display screen 40 of the terminal device 1 can be made larger, and even an overall screen display of the terminal device 1 can be achieved, which greatly improves the user experience.

In detail, the non-display side of the mounting body 10 may include a back side 102 and a circumference side. The back side 102 is opposite to the display side 101. The circumference side is located between the display side 101 and the back side 102, and connects the display side 101 and the back side 102. In one embodiment, the containing groove 106 is located on the circumferential side of the mounting body 10. That is to say, the camera 20 and the adjustment component 30 may be disposed on the circumferential side of the mounting body 10. This design can reduce the difficulty of orientation adjustment of the camera 20 by the adjustment component 30.

It should be noted that the mounting body 10 may be a rectangular structure, but it is not limited thereto. For example, when the mounting body 10 is a rectangular structure, the circumferential side of the mounting body 10 can be formed by sequentially connecting end to end of four planes in which the four planes can be defined as a top surface 103, a bottom surface 104, and two side surfaces 105 connecting the top surface 103 and the bottom surface 104. The containing groove 106 can be disposed on the top surface 103 of the mounting body 10. That is to say, the camera 20 and the adjustment component 30 can be arranged on the top surface 103 of the mounting body 10 which can avoid the situation in which the hand covers the camera 20 when the user is holding the terminal device 1. In addition, it conforms to the user's camera habits.

It should be understood that, when the telescopic degree of each telescopic rod is the same, the first surface 201 of the camera 20 faces the top of the mounting body 10 (the top refers to one side of the top surface 103 of the mounting body 10 away from the bottom surface 104 of the mounting body 10). That is, the images of the objects located above the mounting body 10 can be acquired by the camera 20.

Figure 10:
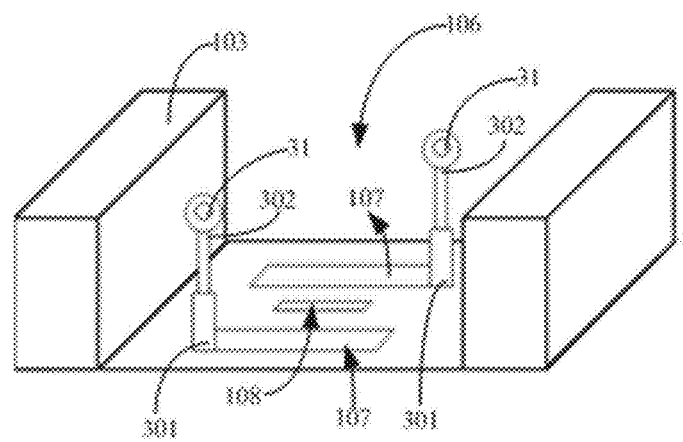
FIG. 10 is an assembly schematic view of the telescopic rod and the containing groove of the camera apparatus shown in FIG. 6.
Figure 11:
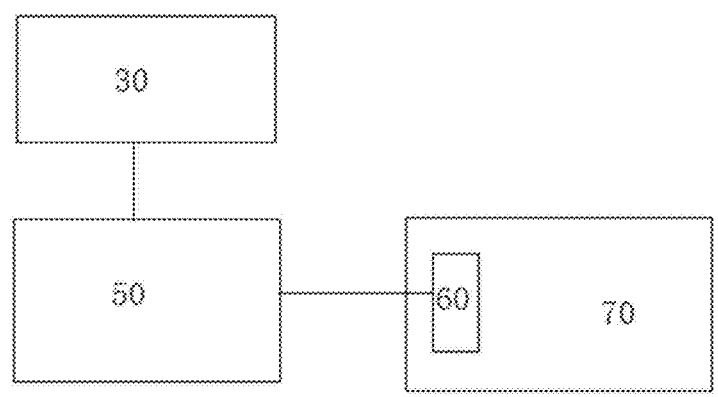
FIG. 11 is a schematic view of the connection relationship between the adjustment component, the driving component, and the circuit board, respectively.

In one embodiment, the inside of the mounting body 10 may provide a circuit board 70, and the circuit board 70 may be a circuit board of the terminal device. As shown in FIG. 10, the groove bottom of the containing groove 106 may be provided with a through hole 108 communicating with the inside of the mounting body 10, where the through hole is used for passing a signal line connecting the camera 20 and the circuit board 70. That is to say, the circuit board 70 in the mounting body 10 can control the operational state of the camera 20. It should be noted that the circuit board 70 can also be connected with the display screen 40. In one embodiment, the user can select the camera mode through the display screen 40, which thereby controls the operation of the camera 20.

In the present embodiment, the through hole 108 is disposed in the groove bottom of the containing groove 106. This design can alleviate the situation in which the signal lines connected the cameras 20 and the circuit board 70 are exposed to external situations, which thereby can improve the stability of the signal transmission between the camera 20 and the circuit board 70, and can improve the appearance quality of the terminal device 1 while improving the user experience.

For example, when the camera apparatus is applied to the terminal device 1, for example, when the camera apparatus is applied to the terminal device 1 such as a mobile phone, the camera 20 in the camera apparatus is mainly used to switch between shooting an object at the display side 101 and shooting an object at the back side 102. In one embodiment, when the camera 20 is used to shoot an object at the display side 101, the camera 20 can be considered to be in a front state. When the camera 20 is used to shoot an object at the back side 102, the camera 20 can be considered to be in a back state.

In order to enable the camera 20 to switch between the front state and the back state, in the present embodiment, a plurality of telescopic rods of the adjustment component 30 may include a first telescopic rod 30a and a second telescopic rod 30b. As shown in FIG. 1, the first telescopic rod 30a is adjacent to the back side 102, and the second telescopic rod 30b is adjacent to the display side 101. In one embodiment, the first surface 201 of the camera 20 faces to the display side 101 by elongating the first telescopic rod 30a relative to the second telescopic rod 30b, that is, the camera 20 is in the front state. The first surface 201 of the camera 20 faces to the back side 102 by elongating the second telescopic rod 30b relative to the first telescopic rod 30a, that is, the camera 20 is in the back state.

Based on the foregoing mentioned content, the camera apparatuses of two different embodiments can be specifically described below.

Embodiment 1

Figure 2:
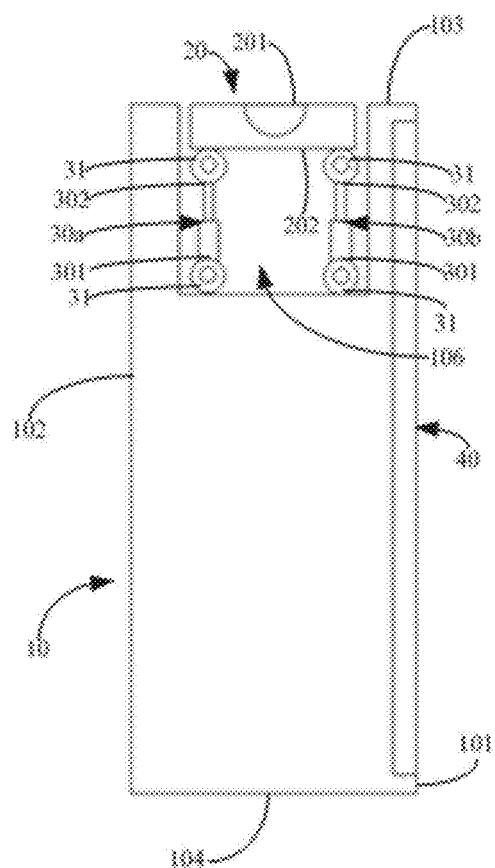
FIG. 2 is the A-A cross-sectional view of the camera apparatus of the embodiment shown in FIG. 1.

As shown in FIG. 2, when the camera 20 is not in use, that is, when the camera 20 is in the initial state, the camera 20 embeds in the containing groove 106 at the top of the mounting body 10, and the first surface 201 of the camera 20 faces the top of the terminal device 1. The second ends 302 of the first telescopic rod 30a and the second telescopic rod 30b are rotatably connected with the second surface 202 of the camera 20 by the rotating shafts 31, respectively. The first ends 301 of the first telescopic rod 30a and the second telescopic rod 30b are rotatably connected with the groove bottom of the containing groove 106 by the rotating shafts 31, respectively.

Figure 3:
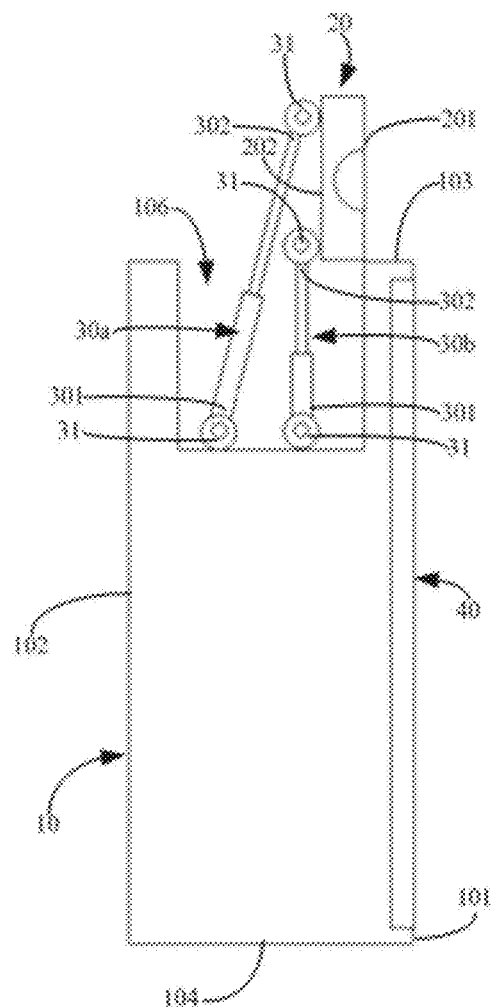
FIG. 3 is the side view of the camera of the camera apparatus shown in FIG. 2 in a front state.
Figure 5:
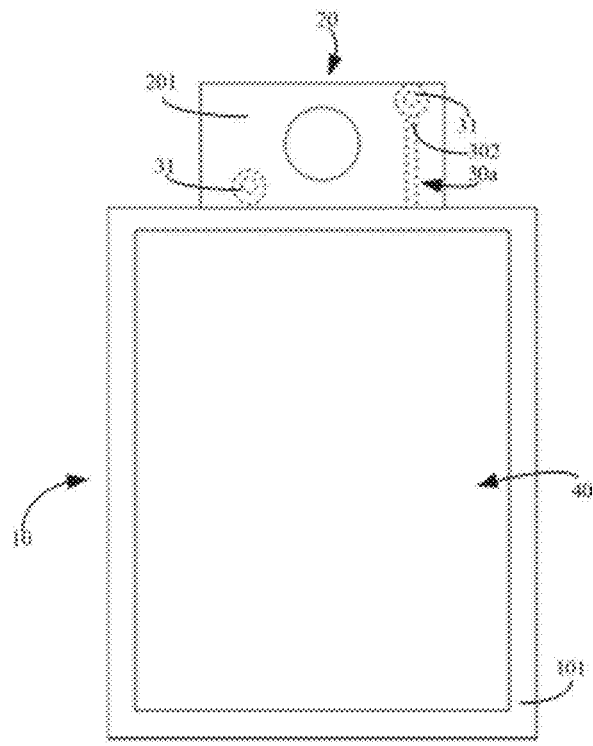
FIG. 5 is the front view of the camera of the camera apparatus shown in FIG. 2 in a front state.

As shown in FIG. 3 and FIG. 5, when the camera 20 shoots in the front, through elongation of the first telescopic rod 30a, and under the interaction force between the first telescopic rod 30a, the second telescopic rod 30b, the mounting body 10 and the camera 20, the two ends of the first telescopic rod 30a are respectively rotated relative to the camera 20 and the mounting body 10, and the second end 302 of the second telescopic rod 30b rotates relative to the camera 20, thereby the camera 20 can rotate in the direction in which the display side 101 is located. When the angle at which the camera 20 rotates toward the display side 101 is 90°, the first surface 201 of the camera 20 faces towards the display side 101. It should be noted that, when the camera 20 rotates in the direction in which the display side 101 is located, the second telescopic rod 30b can maintain the initial state, but it is not limited thereto. The second telescopic rod 30b can also be appropriately elongated. It should be understood that the elongated length of the second telescopic rod 30b is smaller than the extending length of the first telescopic rod 30a.

Figure 4:
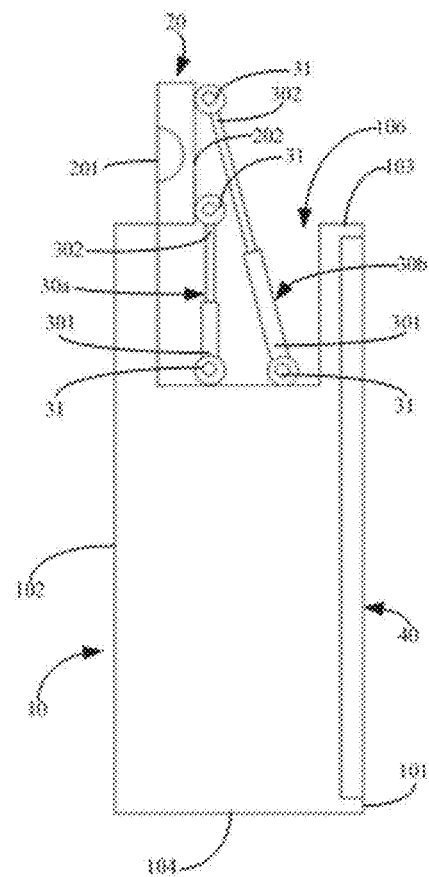
FIG. 4 is the side view of the camera of the camera apparatus shown in FIG. 2 in a back state.

As shown in FIG. 4, when the camera 20 shoots in the back, through elongation of the second telescopic rod 30b and under the interaction force between the first telescopic rod 30a, the second telescopic rod 30b, the mounting body 10, and the camera 20, the two ends of the second telescopic rod 30b respectively rotate relative to the camera 20 and the mounting body 10, and the second end 302 of the first telescopic rod 30a rotates relative to the camera 20, thereby the camera 20 can rotate in the direction in which the back side 102 is located. When the angle at which the camera 20 rotates toward the back side 102 is 90°, the first surface 201 of the camera 20 faces to the back side 102. It should be noted that, when the camera 20 rotates in the direction in which the back side 102 is located, the first telescopic rod 30a can maintain the initial state, but it is not limited thereto. The first telescopic rod 30a can also elongate appropriately. It should be understood that the length of elongation of the first telescopic rod 30a is smaller than the length of elongation of the second telescopic rod 30b.

Embodiment 2

Figure 6:
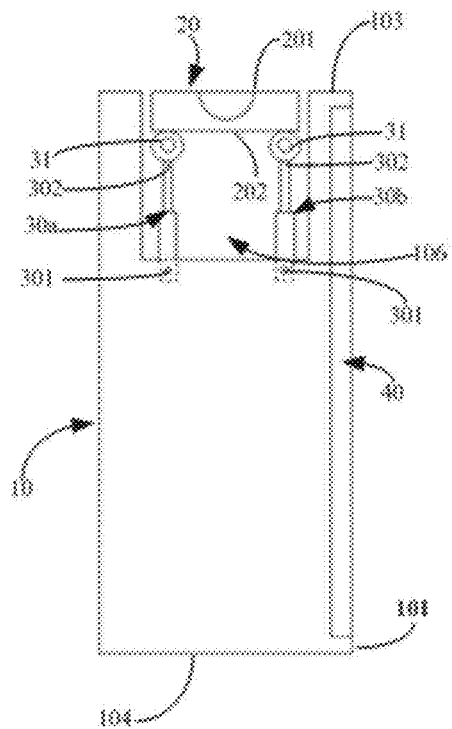
FIG. 6 is the A-A cross-sectional view of the camera apparatus of another embodiment shown in FIG. 1.

As shown in FIG. 6, when the camera 20 is not in use, that is, when the camera 20 is in the initial state, the camera 20 embeds in the containing groove 106 at the top of the mounting body 10, and the first surface 201 of the camera 20 faces the top of the terminal device 1. The second ends 302 of the first telescopic rod 30a and the second telescopic rod 30b are rotatably connected with the second surface 202 of the camera 20 by the rotating shafts 31, respectively. The first ends 301 of the first telescopic rod 30a and the second telescopic rod 30b are located in a sliding slot 17 at the groove bottom of the containing groove 106, respectively. It should be noted that, when the camera 20 is in the initial state, the first ends 301 of the first telescopic rod 30a and the second telescopic rod 30b can be locked in the sliding slot 107 by a locking component, respectively.

Figure 7:
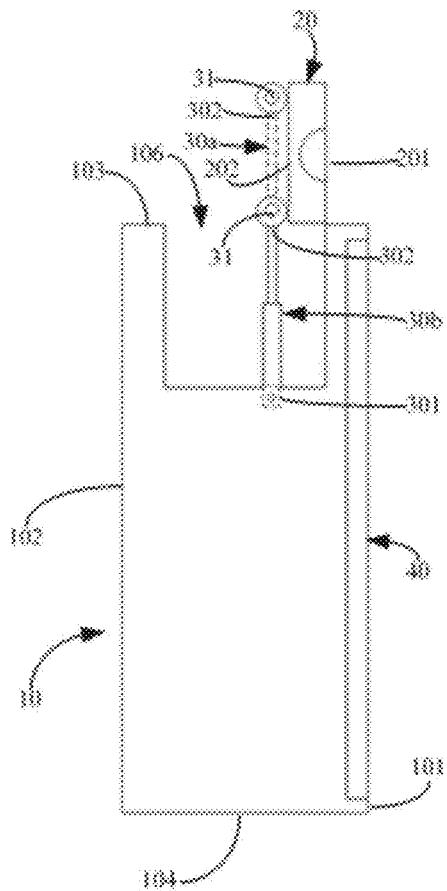
FIG. 7 is the side view of the camera of the camera apparatus shown in FIG. 6 in a front state.
Figure 9:
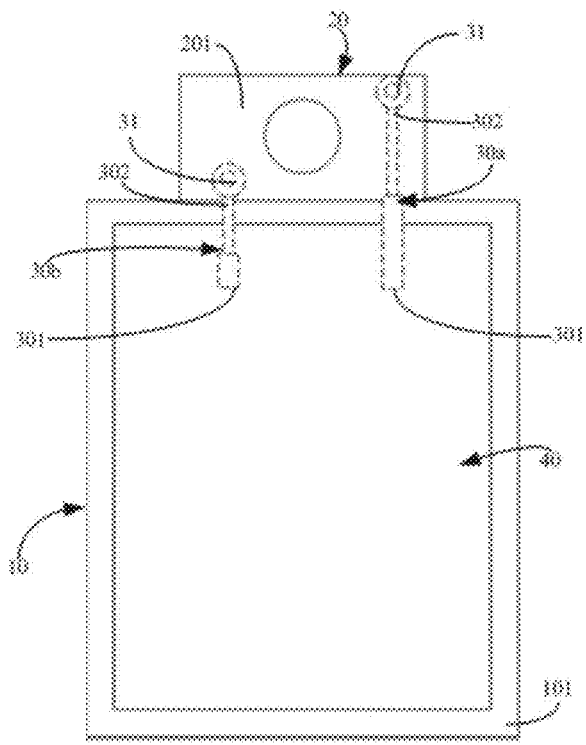
FIG. 9 is the front view of the camera of the camera apparatus shown in FIG. 6 in a front state.

As shown in FIG. 7 and FIG. 9, when the camera 20 shoots in the front, the locking component is in an unlocked state, through elongation of the first telescopic rod 30a and under the interaction force between the first telescopic rod 30a, the second telescopic rod 30b, the mounting body 10, and the camera 20, such that the second ends of the first telescopic rod 30a and the second telescopic rod 30b respectively rotate relative to the camera 20, and the first end 301 of the first telescopic rod 30a slides toward the display side 101 relative to the sliding slot 107, thereby the camera 20 can rotate in the direction in which the display side 101 is located. When the angle at which the camera 20 rotates toward the display side 101 is 90°, the first surface 201 of the camera 20 faces to the display side 101, and the locking component is in a locked state. It should be noted that, when the camera 20 rotates in the direction in which the display side 101 is located, the second telescopic rod 30b can maintain in the initial state, but it is not limited thereto. The second telescopic rod 30b can also elongate appropriately. It should be understood that the length of elongation of the second telescopic rod 30b is smaller than the length of elongation of the first telescopic rod 30a.

Figure 8:
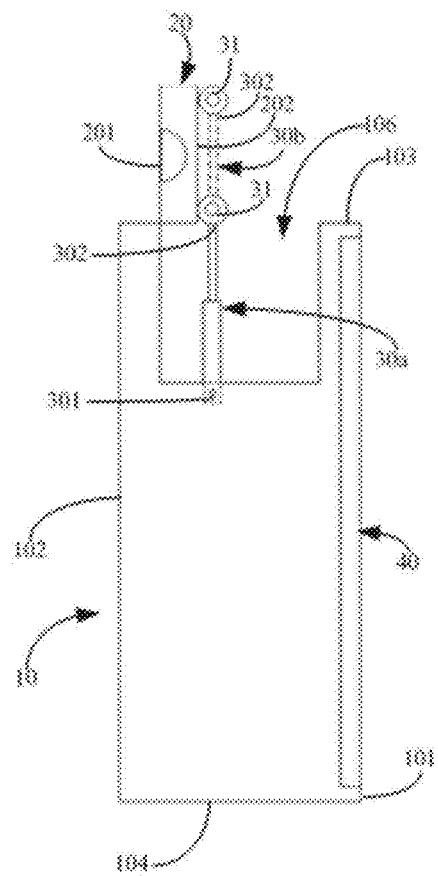
FIG. 8 is the side view of the camera of the camera apparatus shown in FIG. 6 in a back state.

As shown in FIG. 8, when the camera 20 shoots in the back, the locking component is in an unlocked state, through elongation of the second telescopic rod 30b and under the interaction force between the first telescopic rod 30a, the second telescopic rod 30b, the mounting body 10, and the camera 20, such that the second ends 302 of the first telescopic rod 30a and the second telescopic rod 30b respectively rotate relative to the camera 20, and the first end 301 of the second telescopic rod 30b slides toward the back side 102 relative to the sliding slot 107, thereby the camera 20 can rotates in the direction in which the back side 102 is located. When the angle at which the camera 20 rotates toward the back side 102 is 90°, the first surface 201 of the camera 20 faces towards the back side 102, and the locking component is in a locked state. It should be noted that, when the camera 20 rotates in the direction in which the back side 102 is located, the first telescopic rod 30a can maintain the initial state, but it is not limited thereto. The first telescopic rod 30a can also elongate appropriately. It should be understood that the elongating length of the first telescopic rod 30a is smaller than the extending length of the second telescopic rod 30b.

It should be noted that when the terminal device 1 turns on the camera function, it is initially considered to automatically rotate to the front state and then, rotate according to the camera direction selected by the user, but it is not limited thereto.

The camera apparatus and the terminal device are provided in the present disclosure. The camera apparatus may include a mounting body, a camera, and an adjustment component. In one embodiment, one end of each telescopic rod of the adjustment component is connected with the mounting body, and the other end is connected with the camera. The orientation of the framing surface of the camera (that is, a first surface for framing) can be adjusted by adjusting the telescopic degree of each telescopic rod, that is, the camera can switch at multiple angles by adjusting the telescopic degree of each telescopic rod to achieve the camera (that is, framing) function at different angles. Since the camera apparatus can achieve the camera function at different angles through a single camera, the terminal device adopted the camera apparatus to shoot in the present disclosure, compared with the terminal device adopted multiple cameras in the related technologies, can reduce the number of cameras while achieving the camera function at different angles, thereby the cost can be effectively reduced. In addition, through adoption of the camera apparatus for shooting, the area of the display screen of the terminal device can be made larger, and even an overall screen display of a terminal device can be achieved, which greatly improves the user experience.

Further, one embodiment of the present disclosure further provides a terminal device 1, and the terminal device may be a device or an electronic device, such as a mobile phone, a tablet, a notebook computer, or the like.

The terminal device 1 may include the camera apparatus described in any of the above embodiments, and details are not described here again. The terminal device may further include a display screen 40, and the display screen 40 may be mounted on the display side 101 of the mounting body 10.

After considering the specification and practicing the utility model disclosed herein, those skilled in the art will easily think of the other embodiments of the present disclosure. The present disclosure is intended to cover any variations, uses, or adaptive changes of the present disclosure. These variations, uses, or adaptive changes are in accordance with the general principles of the present disclosure and include common general knowledge or conventional technical means in the art that are not disclosed in the present disclosure. The specification and embodiments are deemed to be exemplary only, and the true scope and spirit of the present disclosure are indicated by the attached claims.

What is claimed is:

1. A camera apparatus, comprising:
   a mounting body;
   a camera, comprising:
      a first surface configured for framing;
      a second surface configured for framing and opposite to the first surface;
      an adjustment component comprising a plurality of telescopic rods, each of the telescopic rods comprising:
         a first end actively connected with the mounting body; and
         a second end rotatably connected with the second surface;
   wherein an orientation of the first surface of the camera is adjusted by adjusting a telescopic degree of each of the telescopic rods; and
   wherein the first end is slidably connected with the mounting body, the mounting body is provided with a plurality of elongated sliding slots, and the first end of each of the telescopic rods is located in a sliding slot corresponding to each of the telescopic rods, and the first end is configured to slide along a length direction of the sliding slot.

2. The camera apparatus according to claim 1, further comprising:
   a locking component mounted on the first end of each of the telescopic rods, the locking component being configured to lock the first end of the telescopic rod and the mounting body when the first surface of the camera faces towards a target direction.

3. The camera apparatus according to claim 1, further comprising:
   a driving component connected with each of the telescopic rods, the driving component configured to drive the telescopic rod to perform a telescopic movement to adjust the telescopic degree of the telescopic rod.

4. The camera apparatus according to claim 3, further comprising a control element, wherein the driving component is connected with the control element.

5. The camera apparatus according to claim 1, wherein a side of the mounting body is provided with a containing groove, and the first end of the telescopic rod is connected with a slot bottom of the containing groove.

6. The camera apparatus according to claim 5, wherein the mounting body comprises a display side and a non-display side, and the containing groove is located on a non-display side.

7. The camera apparatus according to claim 6, wherein the non-display side comprises a back side and a circumference side, the back side is opposite to the display side, the circumference side is located between the display side and the back side and is connected with the display side and the back side, and the containing groove is located on the circumference side.

8. The camera apparatus according to claim 7, wherein the circumference side comprises a top surface, and the containing groove is disposed on the top surface.

9. The camera apparatus according to claim 7, wherein,
   the plurality of telescopic rods comprise a first telescopic rod and a second telescopic rod, and the first telescopic rod is adjacent to the display side;
   through elongation of the first telescopic rod relative to the second telescopic rod, the first surface of the camera faces to the display side; and
   through elongation of the second telescopic rod relative to the first telescopic rod, the first surface of the camera faces to the back side.

10. The camera apparatus according to claim 5, wherein the first surface of the camera is located inside the containing groove when each of the telescopic rods is in a contracted state.

11. The camera apparatus according to claim 5, wherein:
   an inside of the mounting body is provided with a circuit board; and
   a groove bottom of the containing groove is provided with a through hole communicating with the inside of the mounting body, the through hole being used to pass a signal line connecting with the camera and the circuit board.

12. A terminal device, comprising:
a camera apparatus, comprising:
a mounting body;
a camera, comprising:
  a first surface configured for framing;
  a second surface configured for framing and opposite to the first surface; and
  an adjustment component comprising a plurality of telescopic rods, each the telescopic rod comprising:
  a first end actively connected with the mounting body; and
  a second end rotatably connected with the second surface;
wherein an orientation of the first surface of the camera is adjusted by adjusting a telescopic degree of each of the telescopic rods; and
wherein the first end is slidably connected with the mounting body, the mounting body is provided with a plurality of elongated sliding slots, and the first end of each of the telescopic rods is located in a sliding slot corresponding to each of the telescopic rods, and the first end is configured to slide along a length direction of the sliding slot.

13. The terminal device according to claim 12, wherein a side of the mounting body is provided with a containing groove, and the first end of the telescopic rod is connected with a groove bottom of the containing groove.

14. A camera apparatus, comprising:
a mounting body;
a camera, comprising:
  a first surface configured for framing;
  a second surface configured for framing and opposite to the first surface;
  an adjustment component comprising a plurality of telescopic rods, each of the telescopic rods comprising:
  a first end rotatably connected with the mounting body; and
  a second end rotatably connected with the second surface;
wherein an orientation of the first surface of the camera is adjusted by adjusting a telescopic degree of each of the telescopic rods; and
wherein, during an orientation adjustment process of the first surface of the camera, a length of at least one of the telescopic rods is changed, and an inclination angle of at least one of the telescopic rods is changed.

* * * * *